Patented Nov. 12, 1940

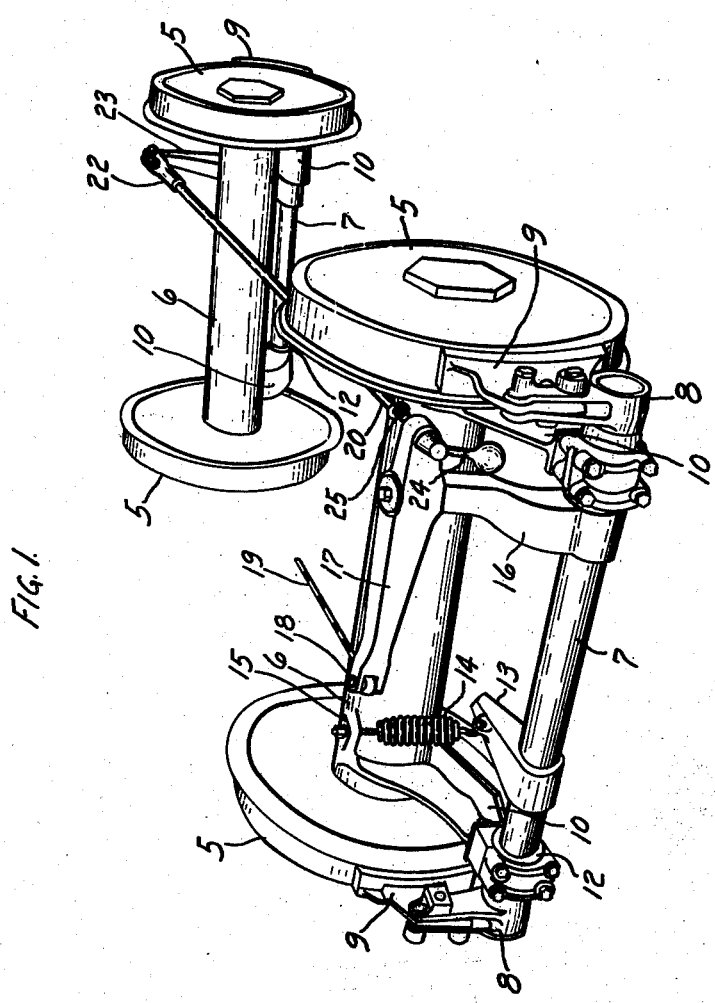

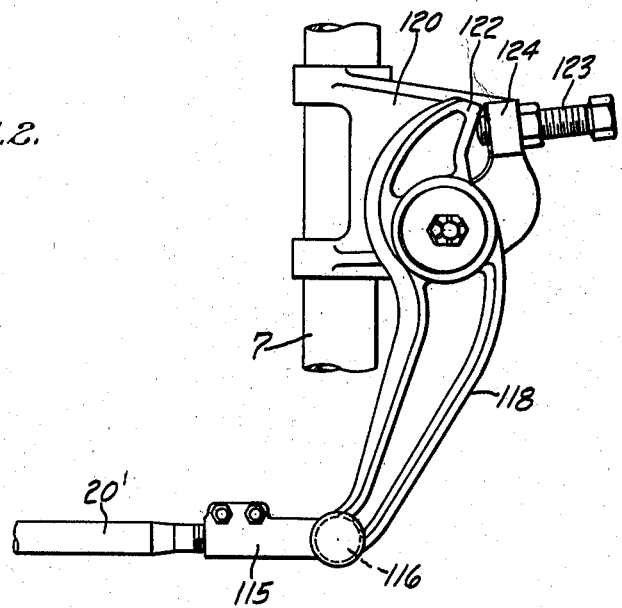
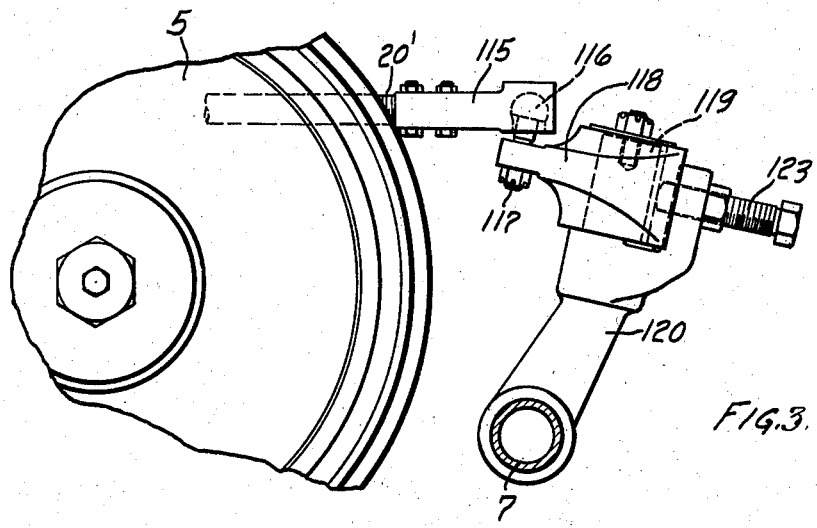

2,221,074

UNITED STATES PATENT OFFICE 2,221,074

BRAKE MECHANISM

Robert J. Burrows and Alfred O. Williams, Battle Creek, Mich., assignors to Clark Equipment Company, Buchanan, Mich., a corporation of Michigan Application March 12, 1938, Serial No. 195,532

6 Claims. (Cl. 188—49)

This invention relates to a brake mechanism and more particularly is directed to a brake mechanism for use with brakes employed on the wheels of a rail car truck or other type of rail vehicle.

In trucks of this type, pneumatic means is usually provided for actuating the brake shoes into engagement with the rims of the car wheels. However, when the car or rail vehicle is to be spotted at a particular location, or parked with the power turned off, it is necessary to provide some hand brake mechanism for holding the car against movement.

The present invention contemplates a hand brake mechanism operable from within the car for setting the brake shoes against the truck wheels, so arranged that substantially equal pressure is applied by the shoes at each wheel, and in which only a single control cable is provided between the actuating mechanism and the car truck.

One of the main objects of the present invention is the provision of a hand brake mechanism having an actuating member within the car body, and connected by a cable to a lever and link arrangement supported on the brake mechanism and cross connected in such manner as to secure substantially uniform application of the brakes at each wheel. The mechanism includes adjustable means for taking up inequalities between the two cross-shafts upon which the respective pairs of brake heads are mounted.

In one of the preferred forms of the invention this adjusting means takes the form of a pivotally mounted arm carried above one of the shafts and adjustably rotated on its support. With such means we are able to provide for proper adjustment and at the same time prevent the introduction of any appreciable slack in the brake system when the brakes are pneumatically, hydraulically or otherwise power actuated. This is of distinct advantage as it eliminates the dangers due to introduction of too much slack in the hand brake system, and still in no wise interferes with the power application of the brakes.

Another feature of the present invention is the extreme simplicity of the brake linkage and actuating mechanism, rendering it economical to manufacture, and also allowing its ready installation in existing structures.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 1 is a perspective view, largely diagrammatic, of one form of the present invention;

Figure 2 is a top plan view of a modified form of brake linkage; and

Figure 3 is a side elevational view of the structure shown in Figure 2.

Referring now in detail to the drawings, we have disclosed in Figure 1 a diagrammatic representation of a rail car truck having the wheels 5 carried by the transversely extending axle sections 6.

Disposed outwardly beyond each axle section 6 there is provided a cross shaft indicated at 7, which at the opposite ends thereof is adapted to carry the brake heads 8 rigidly secured thereto and in turn supporting the brake shoes 9 thereon. The particular type of brake head and brake shoe assembly is preferably similar to that disclosed in the Burrows and Williams patent, No. 2,097,584, issued November 2, 1937. The cross shafts 7 are preferably supported by suitable brackets 10 carried by the axle sections 6, and are journalled for rotation in the bearing sleeves 12.

Each of the cross shafts 7 is also provided with a generally horizontally extending arm portion 13 which, at its free end is connected by means of the spring 14 to a suitable boss 15 on the axle frame which normally tends to rotate the shafts into brake-releasing position.

It is to be understood that in a construction of this type suitable pneumatic or other power operated means is provided for actuating each of the shafts 7 during normal operation of the vehicle, but since the details of such power actuating mechanism form no part of the present invention, it is not believed necessary to describe the same. Suffice it to say that the normal power operation results in a rotational thrust on the shafts 7 rotating the brake heads 8 into position to apply the brake shoes 9 to the tread surfaces of the wheels 5.

Considering now in detail the particular hand brake operating mechanism disclosed in the present invention, it will be noted that one of the shafts 7 is provided with a generally vertically extending arm 16 which is rigidly secured thereto adjacent one of the bracket supports 10, and which at its upper end is provided with suitable bearing means for receiving the transversely extending lever 17 which is pivotally mounted thereon intermediate its ends. The longer extending arm of the lever 17 is provided with a yoke portion 18 to which is connected a flexible tension cable 19 leading to any suitable actuating means within the car, as will be described in detail hereinafter.

The opposite end of the lever 17 is provided with an aperture through which extends the end of a rod 20, the rod 20 extending longitudinally of the truck and being pivotally connected as indicated at 22 at its opposite end to the free end of an arm 23 rigidly secured to the opposite shaft 7.

The end of the rod 20 which extends through the lever 17 is provided with a crank portion 24 which is adapted to be rotated in opposite directions to produce variations in the length of the rod 20, a threaded connection for effecting this being indicated at 25. It will thus be seen that the crank 24 provides means for adjusting the relative angular position of the arms 16 and 23 so that an equalized braking pressure will be applied to the shafts 7.

In the operation of the structure thus far described, tension exerted upon the cable 19 will result in a tendency for the arm 17 to rotate in a clockwise direction about the bearing at the upper end of the arm 16 as viewed in Figure 1. This produces a tension upon the rod 20 resulting in a tendency to rotate the arm 23 toward the associated axle section 6, and likewise produce a thrust upon the arm 16 tending to rotate the associated shaft 7 toward the corresponding axle sections 6. The relative lengths of the two portions of the arm 17 are so related that relatively small tension on the cable 19 will result in an appreciable pull on the rod 20, and inasmuch as the arm 23 is of a length substantially greater than the radial extent of the pivotal connection of the brake shoe to the shaft 7, an appreciable force will be applied to each of the shoes 9. In a preferred form of the invention the force tending to rotate the arm 23 or the pull on the rod 20 is approximately 4,000 pounds, which results in transmitting approximately 4,000 pounds pressure to each of the shoes 9 controlled by the arm 23 when the arm 23 is of a length substantially twice the radial distance from the shaft 7 to the pivotal connection of the shoes 9. Similarly the arm 16 is of an appreciably greater length than the radial distance from the associated shaft 7 to the pivotal connection of the shoes 9, and consequently a corresponding thrust of approximately 3,400 pounds, we find in practice, produces a pressure of 4,000 pounds each at the shoes 9. These pressures are produced with a tension on the cable 19 of only slightly over 600 pounds, but it is of course understood that the relative lengths and proportions of the parts of the brake linkage system may be varied widely to meet the desired conditions.

Considering now the actuating means for producing the tension on the cable 19, reference is made to the copending application of ourselves and William L. Davis, Serial No. 256,658, filed February 16, 1939, which discloses the same in detail.

Considering now Figures 2 and 3, these figures illustrate a modification of the connection between the tie rod 20 and the actuating arm 23 on the remote cross shaft 7. In this embodiment of the invention the tie rod 20' is connected at its end to a clamp member 115. This member is provided with a recess in which is disposed a ball 116 carried by the stud 117 secured to the end of a lever 118, which lever, intermediate its ends, is pivotally supported on the stud portion 119 of the arm 120 secured to the shaft 7. The lever 118 has an extending portion 122 on the opposite side of its pivot which is adapted to be engaged by the end of an adjusting bolt 123 carried in a boss 124 mounted on the arm 120. It will be apparent that the length of the connection between the arms 16 and 120 can thereby be adjusted by threading the bolt 123 inwardly or outwardly with respect to the boss 124, which produces shortening or lengthening of the connection between the two arms.

This particular form of the invention is of distinct advantage when the brakes are power applied, since it allows the arm 120 to be rotated with the shaft 7 upon power rotation of this shaft and yet allows the lever 118 to move pivotally about the arm 120 so that no thrust is produced on the tie rod 20', and consequently no corresponding reaction is produced on the arm 16. The lever 118 merely idles about its pivotal support during this power actuation of the brake and thus produces no interference with the power application of the brakes nor does it produce any slack in the braking linkage or cable which might be undesirable.

It is therefore believed apparent that we have provided a novel type of hand brake mechanism and slack adjusting means for trucks of this type, which is independent of and does not interfere with power application of the brakes and which is so arranged as to produce substantially uniform braking pressure at each of the truck wheels. Also, the mechanism is designed so as to allow for proper application of the brakes and yet prevent more than a predetermined amount of slack in the brakes under normal conditions, unless it is desired to manually increase the amount of slack in order to provide for inspection or repair.

We are aware that various changes in certain of the details of portions of the present invention may be modified considerably without departing from the underlying principles herein described, and we therefore do not intend to be limited except as defined by the scope and spirit of the appended claims.

We claim:

1. A brake mechanism for a rail truck comprising a pair of cross shafts, brake heads mounted in spaced relation on said shafts and carrying brake shoes respectively engageable with the truck wheels, arms rigidly secured to each of said shafts, a lever pivotally mounted intermediate its ends on the upper end of one arm, actuating means connected to one end of said lever, a second lever pivotally mounted at one end on said other arm, means providing relative movement between said second lever and its arm in brake-releasing direction but restraining it for conjoint movement with the arm in brake-applying direction, and a rod connected between the other end of said first lever and the free end of said second lever.

2. A brake mechanism for a rail truck comprising a pair of cross shafts, brake heads mounted in spaced relation on said shafts and carrying brake shoes respectively engageable with the truck wheels, arms rigidly secured to each of said shafts, a lever pivotally mounted intermediate its ends on the upper end of one arm, actuating means connected to one end of said lever, a second lever pivotally mounted at one end on said other arm, and a rod connected between the other end of said first lever and the free end of said second lever, said second lever being free to rotate in brake releasing direction relative to its arm but adjustably restrained against rotation in the opposite direction.

3. A brake mechanism for a rail truck comprising a pair of cross shafts, brake heads mounted in spaced relation on said shafts and carrying brake shoes respectively engageable with the truck wheels, arms rigidly secured to each of said shafts, a lever pivotally mounted intermediate its ends on the upper end of one arm, actuating means connected to one end of said lever, a second lever pivotally mounted at one end on said other arm, and a rod connected between the other end of said first lever and the free end of said second lever, said second arm having abutment means engaging said second lever and adjustable to vary the effective length of connection between said arms, said second lever being free to rotate in a direction away from said abutment means whereby the associated cross shaft can be rotated independently of movement of said rod longitudinally.

4. In combination with a four wheeled rail truck having brake cross shafts adjacent each pair of wheels, of brake heads secured to each of said shafts and having brake shoes engageable with the associated tread surfaces of said wheels upon rotation of said shafts toward each other, an arm rigidly secured to and extending vertically from each shaft, means interconnecting said arms including a lever pivotally mounted intermediate its ends on the upper end of one arm, a second lever pivoted on the upper end of the other arm, abutment means limiting rotation of said second lever in brake-applying direction, a flexible tension cable secured to one end of said first lever, and means for applying tension to said cable to rotate said first lever for drawing the second lever against said abutment means to pull said other arm toward said one arm and simultaneously reacting at the pivotal connection to pull said one arm in the opposite direction.

5. In a brake mechanism for rail trucks, a pair of parallel brake cross shafts having vertically extending arms intermediate their ends, horizontal bearing means at the upper end of each arm, levers pivotally mounted intermediate their ends on said bearing means, a rod interconnecting corresponding ends of said levers, abutment means carried by one arm restraining rotation of its associated lever in brake-applying direction only, and means connected to the free end of the other lever for rotating said other lever to pull said arms toward each other.

6. In combination, a pair of brake cross shafts at opposite ends of a rail truck, brake shoes carried at opposite ends of each shaft engageable with the wheels of said truck, a vertically extending arm secured to each shaft, levers pivotally mounted for horizontal swinging movement on the upper end of each arm, a rod interconnecting said levers, means restraining rotation of one of said levers in brake applying direction only, and actuating means connected to the other of said levers.

ROBERT J. BURROWS.
ALFRED O. WILLIAMS.